United States Patent [19]

Funada et al.

[11] Patent Number: 5,064,567
[45] Date of Patent: Nov. 12, 1991

[54] NEMATIC LIQUID-CRYSTAL COMPOSITION FOR ACTIVE MATRIX APPLICATION

[75] Inventors: Fumiaki Funada; Masako Okada; Shuichi Kohzaki, all of Nara, Japan; Bernhard Scheuble, Seeheim-Jugenheim, Fed. Rep. of Germany; Takamasa Oyama, Kanagawa, Japan

[73] Assignees: Sharp Corporation, Osaka, Japan; Merck Patent Gesellschaft mit beschränkter Haftung, Darmstadt, Fed. Rep. of Germany

[21] Appl. No.: 548,342

[22] Filed: Jul. 5, 1990

[30] Foreign Application Priority Data

Jul. 6, 1989 [EP] European Pat. Off. ............ 89112317

[51] Int. Cl.⁵ .............................................. C09K 19/52
[52] U.S. Cl. .......................... 252/299.61; 252/299.01; 252/299.6; 252/299.62; 252/299.63; 252/299.66; 359/103
[58] Field of Search ............ 252/299.01, 299.63, 252/299.5, 299.6; 350/350 R, 350 S, 334; 570/129, 130, 182, 184; 368/660, 661, 664

[56] References Cited

U.S. PATENT DOCUMENTS

| | | | |
|---|---|---|---|
| 4,302,352 | 11/1981 | Eidenschink et al. | 252/299.63 |
| 4,398,803 | 8/1983 | Pohl et al. | 350/334 |
| 4,419,264 | 12/1983 | Eidenschink et al. | 252/299.63 |
| 4,606,845 | 8/1986 | Römer et al. | 252/299.63 |
| 4,710,315 | 12/1987 | Schad et al. | 252/299.63 |
| 4,724,097 | 2/1988 | Römer et al. | 252/299.63 |

FOREIGN PATENT DOCUMENTS 8902884 4/1989 World Int. Prop. O. .

Primary Examiner—John S. Maples
Assistant Examiner—Shean C. Wu
Attorney, Agent, or Firm—Millen, White & Zelano

[57] ABSTRACT

The invention relates to nematic liquid-crystal compositions for active matrix displays with high voltage holding ratios.

12 Claims, No Drawings

NEMATIC LIQUID-CRYSTAL COMPOSITION FOR ACTIVE MATRIX APPLICATION

SUMMARY OF THE INVENTION

The invention relates to a nematic liquid-crystal composition for active matrix application.

Active matrix displays (AMD) are highly favored for commercially interesting displays with a high information contention. Such AMDs are used for TV applications and also for displays with high information content for automobiles and airplanes.

AMDs have non-linear electrical switching elements which are integrated at each picture element. As non-linear driving elements thin film transistors (TFT) [Okubo, U., et al., 1982, SID 82 Digest, pp. 40–41] or diodes (e.g.: metal insulator metal: MIM) [Niwa, K., et al., 1984, SID 84 Digest, pp. 304–307] can be applied. These non-linear driving elements allow the use of an electrooptical effect with a rather flat electrooptical characteristic if a good viewing angle characteristic can be obtained. So a TN-type LC cell [Schadt, M. and Helfrich, W., 1971, Appl. Phys. Lett., 18, 127] with a twist angle of 90° can be used. To provide good contrast over a wide viewing angle, operation in the first minimum of transmission [Pohl, L., Eidenschink, R., Pino, F. del, and Weber, G., 1980, German Pat., DBP 30 22 818, and 1981, U.S. Pat. No. 4,398,803; Pohl, L., Weber, G., Eidenschink, R., Baur, G., and Fehrenbach, W., 1981, Appl. Phys. Lett., 38, 497; Weber, G., Finkenzeller, U., Geelhaar, T., Plach, H. J., Rieger, B. and Pohl, L., 1988, Int. Symp. on Liq. Cryst., Freiburg, to be published in Liq. Crys.] is required.

These AMDs are very well suited for TV applications and consequently are of high commercial interest. For these applications some physical properties of the liquid crystals become more important than for passive TN displays. Some of the decisive properties for the performance of an AMD are resistivity and stability of the liquid crystal [Togashi, S., Sekiguchi, K., Tanabe, H., Yamamoto, E., Sorimachi, K., Tajima, E., Watanabe, H., Shimuzu, H., Proc. Eurodisplay 84, Sept. 1984: A 210-288 Matrix LCD Controlled by Double Stage Diode Rings, p. 141 ff, Paris; Stromer, M., Proc. Eurodisplay 84, Sept. 1984: Design of Thin Film Transistors for Matrix Addressing of Television Liquid Crystal Displays, p. 145 ff, Paris].

In an AMD, the non-linear switching elements are addressed in a multiplex scheme. So they charge the electrodes of a pixel in the limited time they are active. Then they become inactive until they are addressed again in the next cycle. Consequently, the change of the voltage on an activated (charged) pixel is a nondesired but a very decisive feature of such a display. The discharge of a pixel is determined by two factors. They are the capacity of the electrodes of the pixel and resistivity of the dielectric material between the electrodes, namely the liquid crystal. The characteristic time constant of the decay of the voltage at a pixel (RC-time) has to be significantly bigger than the time between two addressing cycles (tadr.). A parameter frequently used to describe the performance of an AMD is the voltage holding ratio HR of a picture element:

$$HR = \frac{V(to) + V(to + tadr.)}{2\, V(to)}$$

As the voltage at a pixel decays, exponentially an increase of the holding ratio necessitates liquid crystal materials with exceptionally high resistivities.

There are several points of importance for the resistivity of the liquid crystal inside a display, e.g., orientation layers, curing condition of the orientation material. But by no means less important are the electrical properties of the liquid crystal used. Especially the resistivity of the liquid crystal in the display determines the magnitude of the voltage drop at the pixel.

There is thus still a great need for liquid-crystal composition having a high resistivity and other suitable material properties for use in AMDs.

The invention has for its object to provide a liquid-crystal composition with a very high resistivity which meets also the other demands.

Upon further study of the specification and appended claims, further objects and advantages of this invention will become apparent to those skilled in the art.

It has now been found that a nematic liquid-crystal composition based on terminally and laterally fluorinated compounds, characterized in that it contains at least three compounds from group 1:

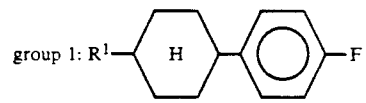

wherein $R^1$ denotes a straight-chain alkyl group of 5 or more carbon atoms, preferably 5 to 9 carbon atoms, at least one compound from group 2:

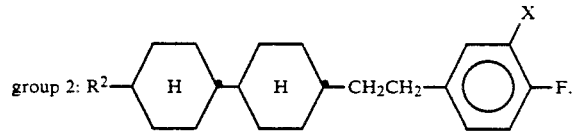

wherein $R^2$ denotes a straight-chain alkyl group of 3 carbon atoms and X is H or F, two compounds of each of the groups 3 and 4

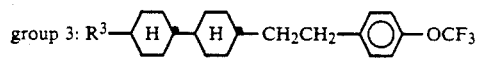

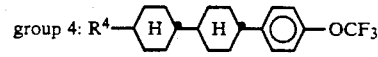

and at least three compounds of group 5:

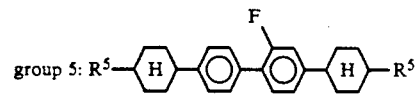

wherein $R^3$ to $R^6$ each independently denotes a straight-chain alkyl group of 3 to 5 carbon atoms, said composition containing
about 25 to 35% by weight of compounds of group 1,
about 10 to 20% by weight of compounds of group 2,
about 15 to 25% by weight of compounds of group 3,
about 20 to 30% by weight of compounds of group 4, and
about 5 to 15% by weight of compounds of group 5, is highly suited for AMD application. Very high RC time values can be obtained in AMDs. These compositions also show a reduced viscosity and allow operation in AMDs in the first minimum of transmission.

Such compositions preferably contain at least three compounds of group 1 wherein R¹ is n-pentyl, n-hexyl and n-heptyl. Preferably, one compound from group 2 is present wherein X denotes F.

The compounds from groups 1 to 5 are known from the European Patent 0 125 563, the International Patent Application WO 89/02884 and U.S. Pat. No. 4,302,352, U.S. Pat. No. 4,710,315 and U.S. Pat. No. 4,419,264 or can be prepared in analogy to known compounds.

The preparation of the compositions according to the invention is effected in the conventional manner. In general, the desired amount of the components which are used in the smaller amount is dissolved in the components which constitutes the main constituent, preferably at elevated temperature. If this temperature is chosen to be above the clear point of the main constituent, the completeness of the process of dissolving can be observed particularly easily.

However, it is also possible to mix solutions of the components in a suitable organic solvent, for example acetone, chloroform or methanol, and to remove the solvent after thorough mixing. for example by distillation under reduced pressure. It is self-evident that with this method it must be ensured that the solvent does not introduce any contaminants or undesirable dopants.

By means of suitable additives, the liquid crystal phases according to the invention can be modified in such a way that they can be used in any hitherto disclosed kind of AMD.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire disclosures of all applications, patents and publications, cited above and below, and of corresponding application EP 89112317.6 filed July 6, 1989, are hereby incorporated by reference.

EXAMPLES

The examples below serve to illustrate the invention without limiting it. In the examples, the melting point and clear point of a liquid crystal substance are given in degrees Celsius. The percentages are by weight.

EXAMPLE 1

A liquid-crystal composition consisting of
12% of trans 1-p-fluorophenyl-4-pentylcyclohexane,
5% of trans-1-p-fluorophenyl-4-hexylcyclohexane,
10% of trans-1-p-fluorophenyl-4-heptylcyclohexane,
13% of p-[trans-4-(trans-4-propylcyclohexyl)-cyclohexyl]-trifluoromethoxybenzene,
12% of p-[trans-4-(trans-4-pentylcyclohexyl)-cyclohexyl]-trifluoromethoxybenzene,
11% of 1-[trans-4-(trans-4-propylcyclohexyl)-cyclohexyl]-2-(p-trifluoromethoxyphenyl)-ethane,
8% of 1-[trans-4-(trans-4-pentylcyclohexyl)-cyclohexyl]-2-(p-trifluoromethoxyphenyl)-ethane,
12% of 1-[trans-4-(trans-4-propylcyclohexyl)-cyclohexyl]-2-(3,4-difluorophenyl)-ethane,
7% of 1-[trans-4-(trans-4-propylcyclohexyl)-cyclohexyl]-2-(p-fluorophenyl)-ethane,
3% of 4,4'-bis-(trans-4-propylcyclohexyl)-2-fluorobiphenyl,
3% of 4,4'-bis-(trans-4-pentylcyclohexyl)-2-fluorobiphenyl and
4% of 4-(trans-4-pentylcyclohexyl)-4'-(trans-4-cyclohexyl)-2-fluorobiphenyl Shows a clearing point of 100°, a viscosity at 20° of 15 m Pa s and a birefringence Δn of +0.085.

EXAMPLE 2

A liquid-crystal composition consisting of
12% of trans 1-p-fluorophenyl-4-pentylcyclohexane,
10% of trans-1-p-fluorophenyl-4-hexylcyclohexane,
10% of trans-1-p-fluorophenyl-4-heptylcyclohexane,
13% of p-[trans-4-(trans-4-propylcyclohexyl)-cyclohexyl]-trifluoromethoxybenzene,
12% of p-[trans-4-(trans-4-pentylcyclohexyl)-cyclohexyl]-trifluoromethoxybenzene,
11% of 1-[trans-4-(trans-4-propylcyclohexyl)-cyclohexyl]-2-(p-trifluoromethoxyphenyl)-ethane,
9% of 1-[trans-4-(trans-4-pentylcyclohexyl)-cyclohexyl]-2-(p-trifluoromethoxyphenyl)-ethane,
13% of 1-[trans-4-(trans-4-propylcyclohexyl)-cyclohexyl]-2-(3,4-difluorophenyl)-ethane,
3% of 4,4'-bis-(trans-4-propylcyclohexyl)-2-fluorobiphenyl,
3% of 4,4'-bis-(trans-4-pentylcyclohexyl)-2-fluorobiphenyl and
4% of 4-(trans-4-pentylcyclohexyl)-4'-(trans-4-propylcyclohexyl)-2-fluorobiphenyl Shows a clearing point of 90°, a viscosity at 20° of 14 m Pa s and a birefringence Δn of +0.085.

Both compositions show high resistivities on the order of $10^{13}$ Ω·cm or more and are well suited for AMDs.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A nematic liquid-crystal composition comprising at least three compounds from group 1

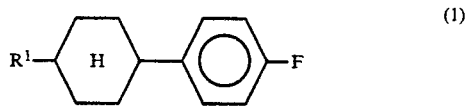

(1)

wherein R¹ denotes a straight-chain alkyl group of 5 or more carbon atoms;
at least one compound from group 2

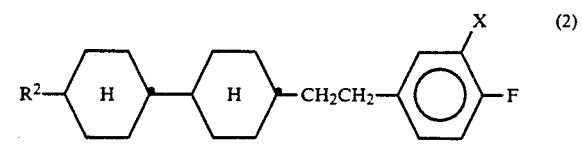

(2)

wherein R² denotes a straight-chain alkyl group of 3 carbon atoms and X is H or F;
two compounds of each of the groups 3 and 4

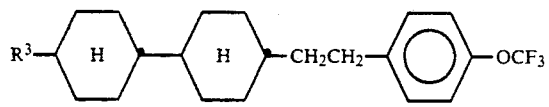

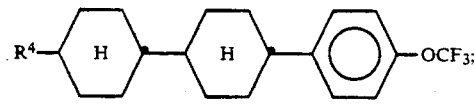

and at least three compounds of group 5

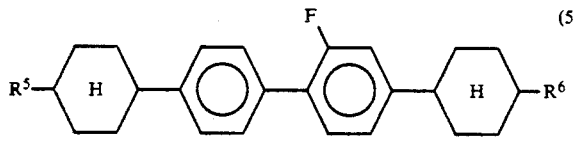

wherein $R^3$ to $R^6$ each independently denotes a straight-chain alkyl group of 3 to 5 carbon atoms; said composition containing about 25 to 35% by weight of compounds of group 1,
about 10 to 20% by weight of compounds of group 2,
about 15 to 25% by weight of compounds of group 3,
about 20 to 30% by weight of compounds of group 4, and
about 5 to 15% by weight of compounds of group 5.

2. A nematic liquid-crystal composition of claim 1, wherein said composition contains at least three compounds of group 1 wherein $R^1$ is n-pentyl, n-hexyl and n-heptyl.

3. A nematic liquid-crystal composition of claim 1, wherein said composition contains at least one compound from group 2 wherein X is F.

4. A nematic liquid-crystal composition of claim 2, wherein said composition contains at least one compound from group 2 wherein X is F.

5. A nematic liquid crystal composition of claim 1, wherein said composition contains at least two compounds of group 3 wherein $R^3$ is propyl and pentyl.

6. A nematic liquid crystal composition of claim 1, wherein said composition contains at least two compounds of group 4 wherein $R^4$ is propyl and pentyl.

7. A nematic liquid crystal composition of claim 1, wherein said composition contains at least one compound of group 5 wherein $R^5$ and $R^6$ are propyl.

8. A nematic liquid crystal composition of claim 1, wherein said composition contains at least one compound of group 5 wherein $R^5$ and $R^6$ are pentyl.

9. A nematic liquid crystal composition of claim 1, wherein said composition contains at least one compound of group 5 wherein $R^1$ is pentyl and $R^6$ is propyl.

10. A nematic liquid-crystal composition of claim 1, wherein said composition contains
trans 1-p-fluorophenyl-4-pentylcyclohexane,
trans-1-p-fluorophenyl-4-hexylcyclohexane,
trans-1-p-fluorophenyl-4-heptylcyclohexane,
p-[trans-4-(trans-4-propylcyclohexyl)-cyclohexyl]-trifluoromethoxybenzene,
p-[trans-4-(trans-4-pentyl-cyclohexyl)-cyclohexyl]-trifluoromethoxybenzene,
1-[trans-4-(trans-4-propylcyclohexyl)-cyclohexyl]-2-(p-trifluoromethoxyphenyl)-ethane,
1-[trans-4-(trans-4-pentylcyclohexyl)-cyclohexyl]-2-(p-trifluoromethoxyphenyl)-ethane,
1-[trans-4-(trans-4-propylcyclohexyl)-cyclohexyl]-2-(3,4-difluorophenyl)-ethane,
4,4'-bis-(trans-4-propylcyclohexyl)-2-fluorobiphenyl,
4,4'-bis-(trans-4-pentylcyclohexyl)-2-fluorobiphenyl and
4-(trans-4-pentylcyclohexyl)-4'-(trans-4-propylcyclohexyl)-2-fluorobiphenyl.

11. A nematic liquid-crystal composition of claim 10, wherein said composition further contains 1-[trans-4-(trans-4-propylcyclohexyl)-cyclohexyl]-2-)p-fluorophenyl)-ethane.

12. In an active matrix display containing a dielectric material, the improvement comprising said dielectric material being a nematic liquid-crystal composition of claim 1.

* * * * *